United States Patent
Wood

(10) Patent No.: US 7,088,921 B1
(45) Date of Patent: Aug. 8, 2006

(54) SYSTEM FOR OPERATING AN ETHERNET DATA NETWORK OVER A PASSIVE OPTICAL NETWORK ACCESS SYSTEM

(75) Inventor: Thomas Huntington Wood, Holmdel, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 521 days.

(21) Appl. No.: 09/332,264

(22) Filed: Jun. 11, 1999

(51) Int. Cl.
*H04J 14/00* (2006.01)

(52) U.S. Cl. .......................................... 398/67; 398/68
(58) Field of Classification Search ................ 359/125, 359/121, 118, 168; 370/464, 480, 445; 398/76, 398/66, 68, 67
See application file for complete search history.

(56) References Cited

U.S. PATENT DOCUMENTS

| | | | |
|---|---|---|---|
| 5,311,344 A * | 5/1994 | Bohn et al. ................. | 359/125 |
| 5,528,582 A * | 6/1996 | Bodeep et al. .............. | 370/276 |
| 5,550,666 A * | 8/1996 | Zirngibl ..................... | 359/124 |
| 5,815,295 A * | 9/1998 | Darcie et al. ............... | 359/128 |
| 5,822,102 A * | 10/1998 | Bodeep et al. .............. | 359/167 |
| 5,872,644 A * | 2/1999 | Yamazaki et al. .......... | 359/121 |
| 5,896,211 A * | 4/1999 | Watanabe ................... | 359/124 |
| 6,088,368 A * | 7/2000 | Rubinstain et al. ......... | 370/480 |
| 6,137,607 A * | 10/2000 | Feldman et al. ............ | 359/125 |
| 6,288,809 B1 * | 9/2001 | Touma et al. ............... | 359/125 |
| 6,317,234 B1 * | 11/2001 | Quayle ....................... | 359/125 |
| 6,493,335 B1 * | 12/2002 | Darcie et al. ............... | 370/344 |
| 6,542,722 B1 * | 4/2003 | Sorrells et al. ............. | 455/110 |
| 6,587,476 B1 * | 7/2003 | Lewin et al. ................ | 370/467 |

OTHER PUBLICATIONS

J. Manchester et al., "IP over SONET", IEEE Communication Magazine, May 1998, pp. 136-142.*
K. Irie et al., "Large Capacity Multiplex-Port Brouter for Regional PC Communication Network System", IEEE 1998 International Zurich Seminar on Broadband Communications. Accessing, Transmission, Networking Proceedings, pp. 273-278.*
M. Amemiya et al., "Low Cost FTTH system Based on PDS Architecture", Global Telecommunications Conference, 1997, GLOBECOM '97, IEEE, vol.: 2, 1997.*
Gordon C. Wilson, Robert D. Feldman, Thomas H. Wood and J. Anthony Stiles, "Burst-Mode Lasers Reduce Optical-Beat Interference in Cable-Modem/FTTH System", 3 pages.
Robert Breyer and Sean Riley, "Switched and Fast Ethernet, Second Edition", Chapter 3, pp. 95-97.
Thomas H. Wood, Gordon C. Wilson, Robert D. Feldman and J. Anthony Stiles, "FiberVista: A Cost-Effective Fiber-to-the-Home (FTTH) System Providing Broad-Band Data Over Cable Modems Along with Analog and Digital Video", IEEE Photonics Technology Letters, vol. 11, No. 4, Apr. 1999, pp. 475-477.

(Continued)

*Primary Examiner*—Shi K. Li

(57) ABSTRACT

A data communications system which provides multiple logical channels on a passive optical network (PON) using subcarrier multiple access (SCMA). The PON includes multiple optical network units (ONU) which each communicate with a head-end over a logical channel. Collisions among upstream transmissions are thereby avoided and high speed Ethernet service over large distances is made possible.

13 Claims, 2 Drawing Sheets

OTHER PUBLICATIONS

Thomas H. Wood, Robert D. Feldman and Richard F. Austin, "Demonstration of a Cost-Effective, Broadband Passive Optical Network System", IEEE Photonics Technology Letters, vol. 6, No. 4, Apr. 1994, pp. 575-578.

* cited by examiner

SYSTEM FOR OPERATING AN ETHERNET DATA NETWORK OVER A PASSIVE OPTICAL NETWORK ACCESS SYSTEM

FIELD OF THE INVENTION

The present invention relates to data communications networks, particularly Ethernet data networks.

BACKGROUND INFORMATION

Ethernet was designed for office environments, where distances between users (and distances between users and networking hubs) are relatively short (~100 meters). Ethernet relies on a shared-bus architecture which is not particularly suited to applications where distances between users are substantially longer, such as in residential applications. In residential applications, a service provider such as a telephone company or an MSO (CATV service provider) might want to have its active equipment located in a central office or hub, which could be up to 20 km from subscribers.

When considering Fiber-To-The-Home (FTTH) or Fiber-to-the-Curb (FTTC) systems, one approach has been a type of network called a Passive Optical Network (PON). A general review of PONs can be found in an article by David W. Faulkner, et al. "Optical Networks for Local Loop Applications," J. Lightwave Technol. 7, pp. 1741–1751 (1989) and in an article by Yih-Kang Maurice Lin and Dan R. Spears, "Passive Optical Subscriber Loops with Multi-access," J. Lightwave Technol. 7, pp. 1769–1777 (1989).

A schematic view of a typical PON is shown in FIG. 1. The PON connects a head-end 10 with a multiplicity of users 30 using passive optical components, such as optical fibers 50, 60 and splitters 40. This avoids having to provide power or maintenance to active components located in the field (often referred to as the "outside plant", or OSP). Generally, one or two feeder optical fibers 50 are run from the head-end 10 out to a passive splitter 40, which distributes the light from the head-end to drop fibers 60 that run to individual users. (For simplicity, FIG. 1 shows one drop fiber 60). At the end of each drop fiber 60, an active component called an Optical Network Unit (ONU) 20 converts the optical signal to an electrical signal for delivery to the customer. At the customer site, various types of Customer Premise Equipment (CPE) 30, such as telephones, computer modems, or televisions, can be attached.

PONs are cost-effective largely because the expensive distribution fiber and head-end equipment is shared over a large number of users. If only a single distribution fiber 50 is used for upstream (ONU to head-end) and downstream (head-end to ONU) transmissions, some means for separating the upstream and downstream signals is required. Similarly, some means is also required for separating the signals of the multiplicity of users. For example, in accordance with the Time Compression Multiplexing (TCM) protocol developed by NTT, time is divided into fairly long periods (~1 ms) called "frames". In the first half of each frame, the head-end sends information out to the ONUs and in the other half of the frame, the ONUs send information to the head-end. The downstream portion of the frame is further subdivided into time slots in which the head-end sends packets addressed to individual ONUs. In the upstream portion of the frame, each ONU is given a time slot in which it is allowed to transmit.

Another approach is Subcarrier Multiple Access (SCMA). SCMA techniques in PONs are described in T. H. Wood, et al., "Demonstration of a Cost-Effective Broadband PON System," Phot. Technol. Lett. 6, pp. 575–578 (1994).

PONs can be configured to carry telephony, video, and data. See, for example, T. H. Wood et al., "Cost-Effective FTTH System Providing Broadband Data over Cable Modems along with Analog and Digital Video," Proceedings of the Optical Fiber Communication Conference, 1998, paper PD-28; and T. H. Wood et al., "FiberVista: A Cost-Effective Fiber-to-the-Home (FTTH) System Providing Broad-Band Data Over Cable Modems Along with Analog and Digital Video," IEEE Phot. Ltrs., Vol. 11, No. 4, April 1999. In the systems described therein, analog and digital video are transported downstream on a PON using a format appropriate for direct connection into a cable-ready TV or a digital set-top-box. Data is transmitted in a format ready for connection to a cable modem.

Both Ethernet and PONs are designed to operate on a shared medium—that is, many users share the same physical medium, and thus must avoid interfering with each other. Typical PONs and Ethernet solve this problem in completely different ways. Because the known protocols for carrying data on PONs (e.g., TCM or cable-modem signaling) are designed specifically for the PONs and are not related to native Ethernet signaling, conventional PONs require complicated interfaces between the PON and an Ethernet Network Interface Card (NIC).

As described above, a common approach for upstream transmission in a PON is to have the head-end allocate to individual ONUs time slots during which each ONU can talk. This is termed Time-Division Multiple Access (TDMA). If each ONU talks only when allowed, no collisions will occur. Ethernet, however, which is designed for shorter distances uses another approach: Carrier Sense Multiple Access/Collision Detection (CSMA/CD). The operation of Ethernet is set forth in the IEEE 802.3 specification (which is described in R. Breyer et al., "Switched and Fast Ethernet", 2nd Ed., Ziff-Davis Press, Emeryville, Calif.) In accordance with CSMA/CD, each NIC listens to the bus before talking. If the bus is not in use, a NIC speaks (i.e., transmits a packet). Usually, the transmitted packet will get through to its destination. Nonetheless, there is still the possibility of a collision. This could occur when a first NIC (NIC1) talks, yet the bus appears available to a second NIC (NIC2) for a period of time after NIC1 has begun to talk. This period of time is due to the finite amount of time required for the packet transmitted from NIC1 to reach NIC2.

To solve this collision problem, the NICs continue to listen to the bus while they are talking. If a NIC senses someone else talking, the NIC stops talking and assumes that its packet did not make it through. The NIC then waits a short time and retransmits.

The CSMA/CD scheme works well if the time it takes for information to propagate from one NIC to another is short compared to the time it takes to transmit the shortest packet. If this condition is violated, NIC2 might finish transmitting its packet before the packet from NIC1 arrives, and NIC2 would think its packet got through when in fact it did not. Thus, Ethernet operation becomes problematic as the physical size of the bus (and thus the time it takes for a packet to propagate from one NIC to another) increases. This is one reason why Ethernet links are typically defined for distances of approximately only 100 m and why extending those distances to ranges on the order of 20 km has thus far not been practicable.

SUMMARY OF THE INVENTION

The present invention is directed to a data communications system which overcomes many of the aforementioned limitations of known systems. The present invention provides a means of increasing the applicability of Ethernet data networks, particularly to the area of residential data delivery. In accordance with the present invention, Ethernet data service over optical fiber networks on the order of 20 km long is possible.

In accordance with the present invention, a single PON shared bus is subdivided into several logical busses, so that each of a plurality of NICs can communicate with the head-end on its own logical bus. The logical busses are configured so that the individual NICs can communicate with the head-end independently of each other, so that collisions between NICs cannot take place. As a result, the system of the present invention overcomes the problem of limited bus length which characterizes conventional Ethernet data networks.

The present invention overcomes the requirement for an expensive and complex interface by transporting Ethernet traffic on a PON in a format similar to its native format.

In a preferred embodiment, the head-end NIC transmitter operates at a higher speed Ethernet than the ONU NIC transmitters. For example, if each user on a 16-way PON is to be provided with service on the order of 10 Mb/s (10-baseT), the head-end transmitter can be operated at 100 Mb/s (100-baseT). Each ONU receiver receives the 100 Mb/s signal and selects only packets designated for it by looking at the Medium Access Control (MAC) address. The electrical signals commonly used in 10 and 100-baseT Ethernet are converted to optical signals for transmission on the PON. By sharing a single 100 Mb/s signal over 16 users, and considering some statistical multiplexing, the users receive downstream data service as good as, or better than, that provided by dedicated 10 Mb/s links. Alternatively, the head-end transmitter can operate at Gigabit Ethernet ("GbE" or 1000-baseT) and the users can each be provided with 100 Mb/s service (100-baseT).

In a preferred embodiment, multiple upstream logical busses are created using Subcarrier Multiple Access (SCMA) in which each ONU is assigned a different subcarrier frequency. Instead of transmitting its upstream data with baseband signaling, each ONU modulates an RF carrier at its assigned subcarrier frequency with its data. Techniques such as Frequency-shift keying (FSK) or quadrature phase-shift keying (QPSK) can be used to modulate the subcarriers. As long as the information bandwidths of the various upstream signals do not overlap, each ONU thus has its own logical bus, and can transmit to the head-end at any time without fear of colliding with signals from another ONU.

DETAILED DESCRIPTION

Figure 1:
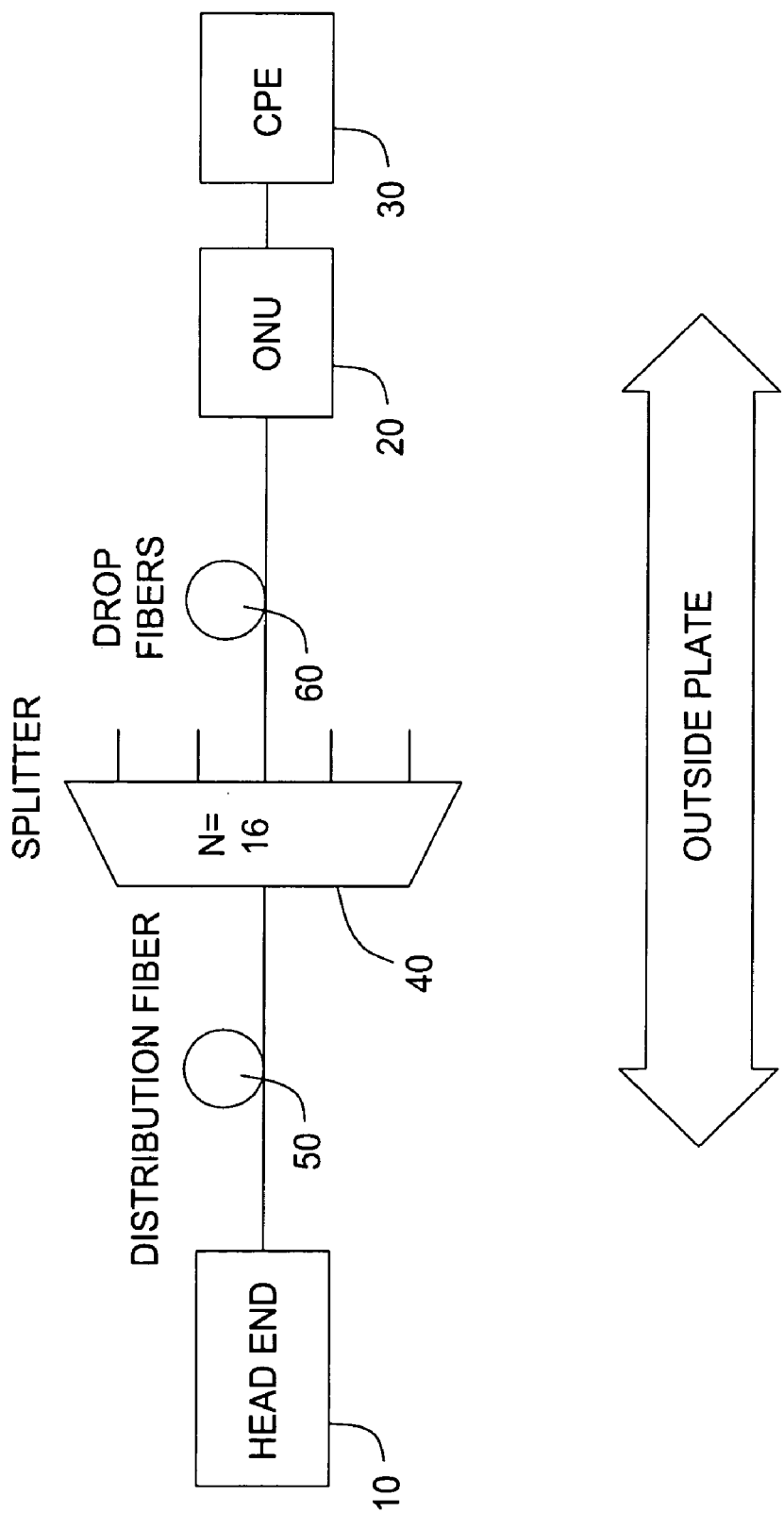
FIG. 1 shows a block diagram of a generic passive optical network (PON).
Figure 2:
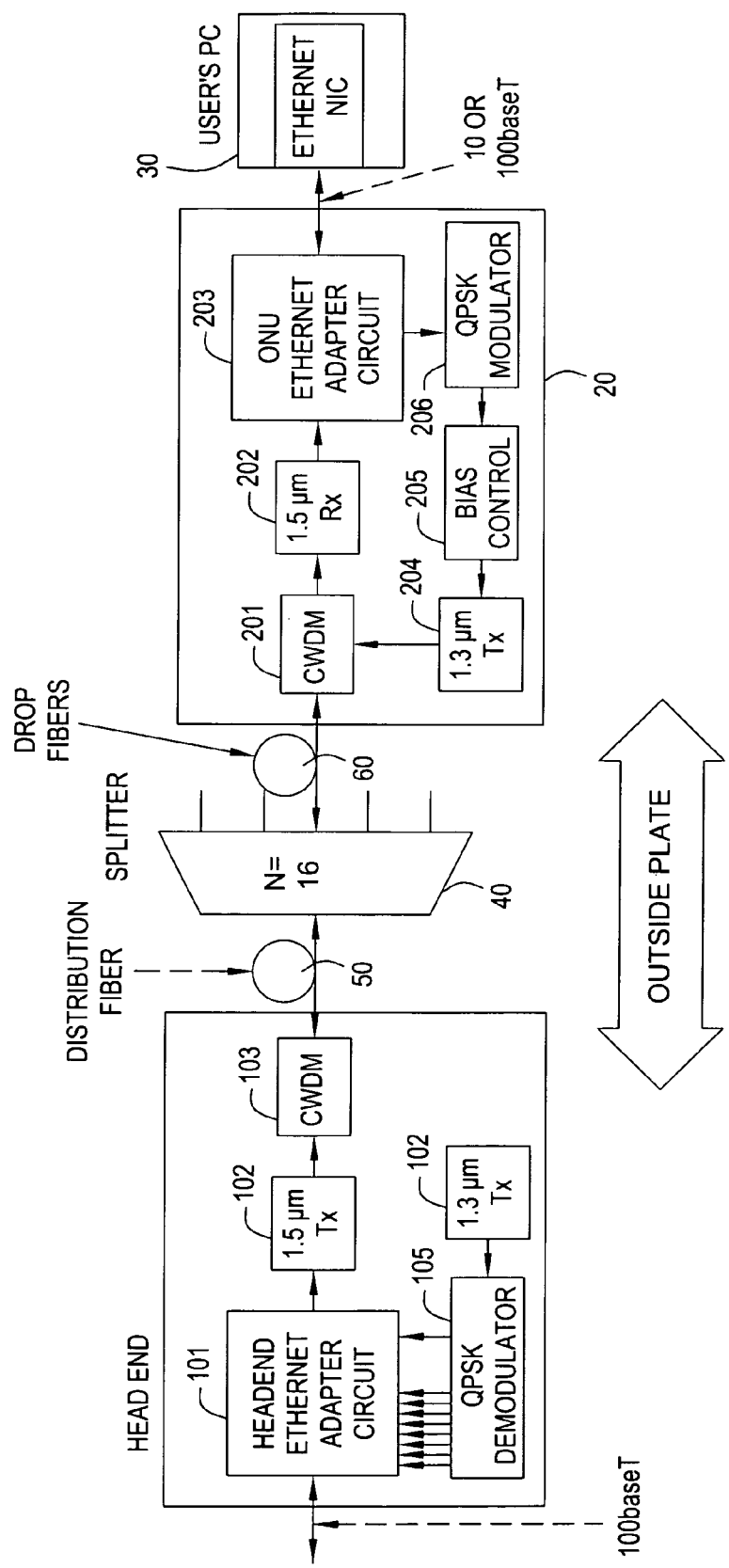
FIG. 2 is a block diagram of an exemplary embodiment of a system in accordance with the present invention.

FIG. 2 shows an exemplary embodiment of a data communications system in accordance with the present invention.

In the exemplary system of FIG. 2, the head-end 10 comprises a Headend Ethernet adapter circuit 101 which is connected via a 100-baseT connection, for example, to a data network (not shown) of a service provider. The data network may be connected, in turn, to the Internet, for example, since a likely application of this network is to provide Internet access. The Headend Ethernet adapter circuit 101 passes the downstream 100-baseT signal to a 1.5 µm transmitter (Tx) 102. In addition, the adapter circuit 101 combines a plurality of upstream signals provided by a QPSK demodulator 105 (which generates one ~10 Mb/s signal for each upstream channel) into a single 100-baseT signal for connection to the head-end data network. Some buffering may be needed in the adapter circuit 101 to avoid losing packets in the process of combining the upstream channels.

The output of the 1.5 µm head-end transmitter 102 is connected to the distribution fiber 50 through a coarse Wavelength-Division Multiplexing (CWDM) device 103.

As in a conventional PON, the distribution fiber 50 is coupled to a splitter 40 which distributes the downstream signal to a plurality of ONUs 20, via drop fibers 60. For example, the splitter 40 can be a 16-way splitter, coupled to 16 ONUs 20 via 16 drop fibers 60. In FIG. 2, only one drop fiber 60 and one ONU 20 are shown for simplicity. The distribution fiber 50, splitter 40 and drop fibers 60 comprise the "outside plant" of the exemplary system of FIG. 2.

In each ONU 20, a CWDM device 201 routes the downstream signal to a 1.5 µm receiver (Rx) 202 which outputs an electrical signal that is sent to an ONU Ethernet adapter circuit 203. The adapter circuit 203 is coupled via a 10-baseT or 100-baseT link to a user device such as a PC 30 having an Ethernet Network Interface Card (NIC) 301. Although FIG. 2 shows only a single PC in the user's premises, it is understood, for example, that an entire Ethernet LAN, with multiple Ethernet devices, can be connected to the ONU Ethernet adapter circuit 203, using standard Ethernet equipment. If the connection to the user's PC 30 is via a 100-baseT link, the downstream 100-baseT signal can be applied directly to this link. In this case, the Ethernet NIC 301 will filter out packets destined for other users. If the connection to the user's PC is via a 10-baseT link, the ONU Ethernet adapter circuit 203 performs the packet filtering. In order to accomplish this, the circuit 203 has knowledge of the Media Access Control (MAC) addresses of the user's PC (and any other user devices connected to the home Ethernet) and selects packets in accordance with the MAC addresses.

In the upstream direction, packets from the user's PC 30 are received by the ONU Ethernet adapter circuit 203. The adapter circuit 203 provides the upstream packets to a QPSK modulator 206. The QPSK modulator 206 receives upstream bits at the line rate (e.g., 12.5 Mb/s for 10-baseT), and modulates the upstream bits on the subcarrier assigned to the particular ONU 20.

An exemplary frequency allocation for a 16-ONU Ethernet PON can be selected as follows. If each ONU 20 is to be able to signal at a 10 Mb/s line rate using a 4B5 line code, the actual line rate will be 12.5 Mb/s. Using QPSK, which encodes two bits for each symbol, the symbol rate will be 6.25 Msymbols/sec. An 8 MHz channel spacing between the subcarriers should be sufficient for such a symbol rate. As such, the 16 ONUs will require 128 Mhz (8 Mhz×16) of spectrum. Furthermore, if the subcarriers are confined to an octave, second-order distortion in the ONU sources can be eliminated as a concern. Thus, for example, if the first subcarrier is at 150 MHz, the last subcarrier can be at 270 Mhz (15×8 Mhz+150 Mhz). As can be understood, various frequency allocation plans can be implemented depending on the number of users and the desired upstream service level (e.g., 10-baseT, 100-baseT, 1000-baseT) for each user.

If the connection to the user's PC is via a 10-baseT link, the 10 Mb/s line rate can be applied to the QPSK modulator 206 without buffering. If, however, the connection to the user's PC 30 is via a 100-baseT link, the Ethernet adapter circuit 203 will buffer packets and output them at a slower rate to the QPSK modulator 206. If its buffer gets close to full, the Ethernet adapter circuit 203 can use techniques well-known in Ethernet applications to slow down the transmissions from the user's PC 30. (See, e.g., R. Breyer et al., "Switched and Fast Ethernet," 2nd. Ed., Ziff-Davis Press, pp. 95–97.) For example, in a full-duplex link, the Ethernet adapter circuit 203 can force the user's PC 30 to suspend transmissions by generating a PAUSE frame. In a half-duplex link, the Ethernet adapter circuit 203 can force a collision with the user's PC 30, forcing the PC to suspend transmissions.

The output of the QPSK modulator 206 is coupled to a bias control circuit 205, described more fully below. After passing through the bias control circuit 205, the modulated subcarrier signal is applied to a 1.3 μm transmit laser 204. The transmit laser 204 can be, for example, an inexpensive, uncooled Fabry-Perot laser commonly proposed for use in upstream access systems. The output of the laser 204 is applied to the CWDM device 201 which puts 1.3 μm upstream signal on the same fiber network used for the 1.5 μm downstream transmissions.

In the head-end 10, the CWDM device 103 separates off the upstream signals from the ONUs 20 and applies the upstream signals to a 1.3 μm receiver (Rx) 104. The output of the Rx 104 is connected to the QPSK demodulator 105. As mentioned above, the demodulator 105 simultaneously demodulates signals from the plurality of ONUs 20. These signals are applied to the head-end Ethernet adapter circuit 101.

In the exemplary system of FIG. 2, there is no significant possibility of upstream packet collisions. This is because each ONU 20 has its own subcarrier-based logical network. Thus, there is no need to coordinate transmission from the individual ONUs. In the extremely unlikely event that almost all of the ONUs 20 seek to transmit large amounts of data upstream simultaneously, thus threatening to overfill the upstream buffer in the head-end Ethernet adapter circuit 101, the circuit can temporarily signal all ONUs to cease transmission via the downstream link. Once this buffer is less full, transmission can resume.

The network of FIG. 2 can be thought of as an example of a subcarrier multiple access (SCMA) network. It is well known that SCMA networks are susceptible to a form of interference termed Optical Beat Interference (OBI). (This is described in Wood et al., "Operation of a Passive Optical Network with Subcarrier Multiplexing in the Presence of Optical Beat Interference," J. Lightwave Technol. 11, 1993, pp. 1632–1640). Briefly, if two or more of the upstream lasers are operating simultaneously and have components of their optical spectra too close in wavelength, these components can beat at the head-end receiver 104 and generate noise. This noise can interfere with the operation of the upstream network.

This effect has been described in U.S. patent application Ser. No. 09/027,635, entitled BROADBAND COMMUNICATIONS METHOD AND APPARATUS FOR REDUCING OPTICAL BEAT INTERFERENCE, filed Feb. 23, 1998 and incorporated herein by reference in its entirety. Methods described therein to decrease the effect of OBI in SCMA networks carrying data traffic can be employed in the system of the present invention. An effective way to decrease the effect of OBI in the exemplary system shown in FIG. 2 is to ensure that the ONU transmit lasers 204 are turned on only when they are actually transmitting data. The bias control circuit 205, coupled between the modulator 206 and the laser 204, keeps the laser below threshold until an RF burst arrives. When the burst is detected, the bias control circuit 205 smoothly increases the bias to the laser 204 to permit upstream transmission. In the exemplary system of FIG. 2, the laser 204 and bias control circuit 205, advantageously can be collocated within each ONU 20. The use of the bias circuit 205 in each ONU 20 also has the effect of reducing the amount of Relative Intensity Noise (RIN) and shot noise that the head-end detector 104 sees. The bias control circuit 205 is very effective in reducing the effect of OBI on upstream transmission of packet data.

What is claimed is:

1. A data communications system comprising:
   an outside plant, the outside plant including a distribution fiber, a splitter and a plurality of drop fibers;
   a head-end, the head-end further comprising an Ethernet adapter circuit and being coupled to the splitter via the distribution fiber;
   a first network unit, the first network unit being coupled to the splitter via a first of the plurality of drop fibers, wherein the first network unit receives a first upstream data stream from a first user source via an Ethernet interface, modulates a first signal with the first upstream data stream and transmits the modulated first signal to the head-end via the outside plant; and
   a second network unit, then second network unit being coupled to the splitter via a second of the plurality of drop fibers, wherein the second network unit receives a second upstream data stream from a second user source via an Ethernet interface, modulates a second signal with the second upstream data stream and transmits the modulated second signal to the head-end via the outside plant,
   whereby the first and second network units can transmit the modulated first and second signals to the head-end substantially simultaneously without collision.

2. The system of claim 1, wherein at least one of the first and second signals is a carrier signal.

3. The system of claim 2, wherein each network unit includes:
   an adapter circuit, the adapter circuit receiving the upstream data;
   a modulator, the modulator being coupled to the adapter circuit and modulating the carrier signal with the upstream data; and
   a transmitter, the transmitter being coupled to the modulator and generating an optical signal in accordance with the modulated carrier signal.

4. The system of claim 3, wherein each network unit includes a bias control circuit coupled between the modulator and the transmitter, the bias control circuit disabling the transmitter in the absence of a signal from the modulator.

5. The system of claim 3, wherein the modulator comprises a quadrature phase-shift keying modulator.

6. The system of claim 3, wherein the modulator comprises a frequency-shift keying modulator.

7. The system of claim 3, wherein the transmitter includes a 1.3 μm laser.

8. The system of claim 3, wherein the adapter circuit provides an Ethernet interface for coupling to a data communications device.

9. The system of claim 1, wherein the first and second network units comprise optical network units.

10. The system of claim 1, wherein the head-end receives the first and second upstream data streams and provides the first and second upstream data streams in a packet format.

11. The system of claim 1, wherein the head-end transmits a downstream data stream to the first and second network units via the outside plant.

12. The system of claim 1, wherein:
the head-end includes a transmitter, a receiver and a wavelength-division multiplexing device, and
each network unit includes a transmitter, a receiver, and a wavelength-division multiplexing device,
wherein in each of the head-end and the network units, the wavelength-division multiplexing device is coupled to the outside plant, the receiver and the transmitter, the wavelength-division multiplexing device coupling optical signals of different wavelengths on the outside plant.

13. The system of claim 12, wherein the receiver in the head-end and the transmitters in the network units operate at a first wavelength and the transmitter in the head-end and the receivers in the network units operate at a second wavelength.

* * * * *